(12) United States Patent
Henzerling

(10) Patent No.: US 7,143,939 B2
(45) Date of Patent: Dec. 5, 2006

(54) WIRELESS MUSIC DEVICE AND METHOD THEREFOR

(75) Inventor: David P. Henzerling, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/741,208

(22) Filed: Dec. 19, 2000

(65) Prior Publication Data

US 2002/0074413 A1    Jun. 20, 2002

(51) Int. Cl.
*G06K 7/00*    (2006.01)
(52) U.S. Cl. .............................. 235/435; 707/3; 707/10
(58) Field of Classification Search ................... 707/3, 707/10; 235/435, 375, 492; 365/52
See application file for complete search history.

(56) References Cited

U.S. PATENT DOCUMENTS

| | | | | | |
|---|---|---|---|---|---|
| 5,633,888 | A | * | 5/1997 | Stewart ....................... | 375/132 |
| 5,877,975 | A | * | 3/1999 | Jigour et al. ................... | 365/52 |
| 6,167,251 | A | * | 12/2000 | Segal et al. .................. | 455/406 |
| 6,230,319 | B1 | | 5/2001 | Britt, Jr. et al. ............... | 717/11 |
| 6,253,122 | B1 | * | 6/2001 | Razavi et al. .................... | 701/1 |
| 6,256,303 | B1 | * | 7/2001 | Drakoulis et al. ........... | 370/344 |
| 6,323,893 | B1 | * | 11/2001 | Tosaya .................... | 348/14.08 |
| 6,362,730 | B1 | * | 3/2002 | Razavi et al. ................ | 340/438 |
| 6,366,907 | B1 | * | 4/2002 | Fanning et al. ................. | 707/3 |
| 6,370,449 | B1 | * | 4/2002 | Razavi et al. ................ | 340/438 |
| 6,496,704 | B1 | * | 12/2002 | Yuan ........................... | 455/466 |
| 6,636,854 | B1 | * | 10/2003 | Dutta et al. .................... | 707/10 |

OTHER PUBLICATIONS

"Using a Windows 95 peer-to-peer network" by Al Fasoldt, 1997 (http://aroundcny.com/technofile/texts/tec022397.html).*
"How to set up a Windows 95 & Windows 98 Peer to Peer Network—a step by step guide" published by Sait Roch Tree Technologies (http://www.saintrochtree.com/zones/it/guides/Jan. 1, 2001-a/).*
"Building a Windows 95 Peer to Peer network" published by Brother (http://www.brother.com/european/networking/chapter3/chapter3_networking-peer-to-peer.html).*
Results for "http://www.brother.com/european/networking/chapter3/chapter3_networking-peer-to-peer.html" dated using the Internet archive website http://www.archive.org.*

* cited by examiner

*Primary Examiner*—Ahshik Kim
*Assistant Examiner*—Daniel A. Hess
(74) *Attorney, Agent, or Firm*—Schwabe, Williamson & Wyatt, P.C.

(57) ABSTRACT

Briefly, in accordance with one embodiment of the invention, a music player may receive a requested music file through a wireless communication. For example, the device may establish a peer-to-peer wireless communication path(s) with another device to initiate a request for a music file without a priori knowledge of whether the file is available to the another device. The device may then receive the music file from the remote device through a peer-to-peer wireless communication path(s).

21 Claims, 2 Drawing Sheets

WIRELESS MUSIC DEVICE AND METHOD THEREFOR

BACKGROUND

In order to provide consumers with greater flexibility in the music that they listen to, for example, while in an automobile, devices have been developed that allow a user to store music files into memory that may be played back as the user desires. The typical device may include hard disk drives that may be removed to be programmed. The hard disk may be connected to a personal computer (PC) or a music system so that the music may be transferred from a compact disc to the hard disk drives. The hard disk drives may also be programmed with music files (e.g., MP3 files) that are downloaded from the internet.

However, there are several drawbacks to music players that rely on hard disk drives to store music. To begin, the hard disk drives are expensive and may not be well suited for all applications. For example, if the music player is used in an automobile environmental conditions such as temperature and vibrations may affect the reliability and performance of the disk drives. Also, the disk drives must be removed from the player (e.g., from the automobile) and hard wired to a personal computer if the music files are to be updated.

Another alternative music system, allow a user to subscribe to a music service that may provide music to a user through a satellite network. However, such systems do not allow the user to select the music to be played as the service, not the user, determines what music is to be played. Thus, there is a continuing need to provide music to a user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
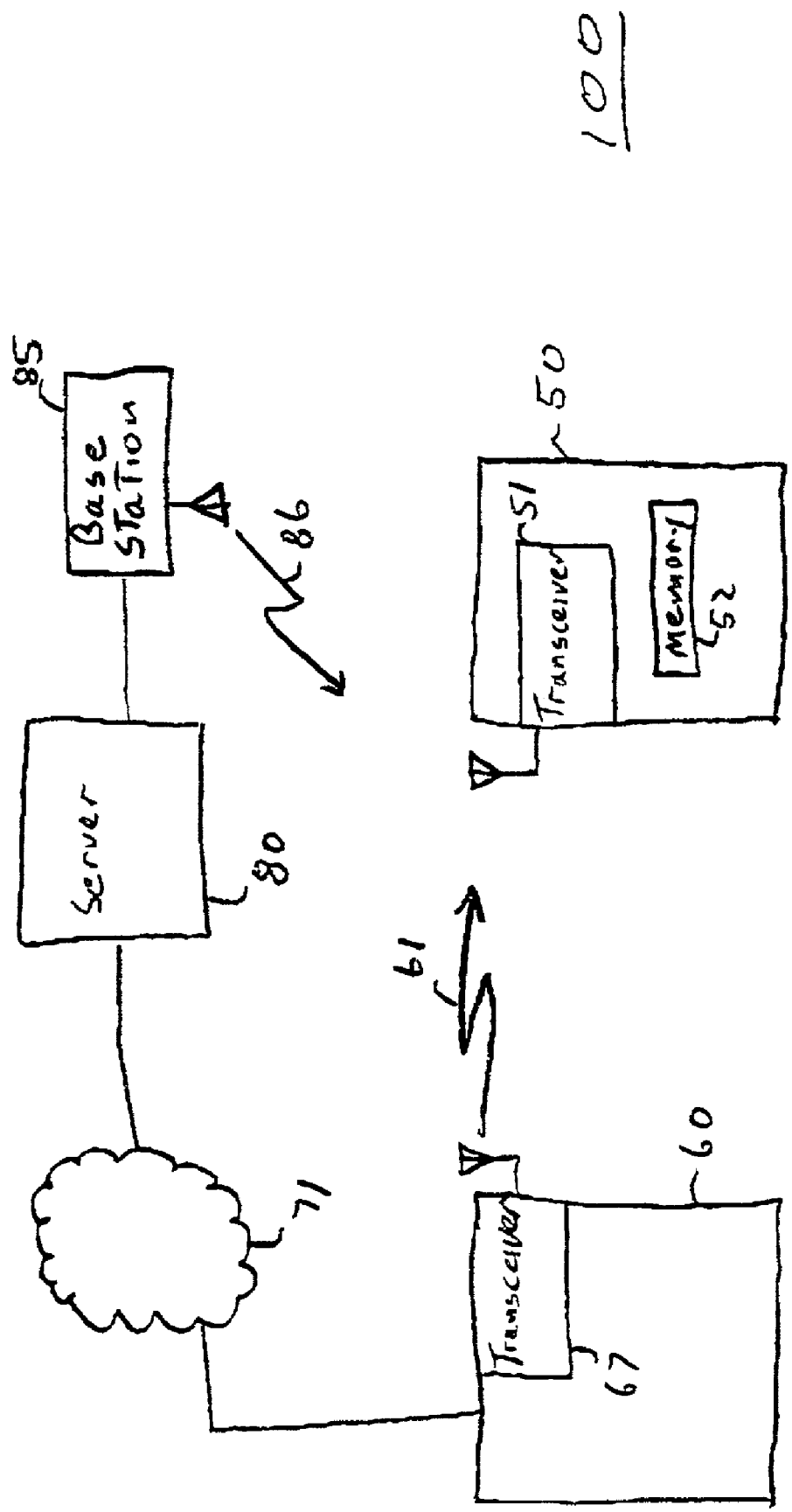
FIG. 1 is a block diagram representation of a wireless network adapted to provide requested music files in accordance with embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a music player 50 that may be portable (e.g. part of a cell phone, a two-way radio communication system, a one-way pager, a two-way pager, a personal communication system (PCS), a portable computer, or the like) or may be mounted in a mobile device such as an automobile. Although it should be understood that the scope and application of the present invention is in no way limited to these examples as the scope of the present invention is intended to include device that are not considered portable as well.

Music player 50 may comprise a transceiver 51 that may be used to request and/or receive music files requested by a user. Although the scope of the present invention is not limited in this respect, transceiver 51 may include a transmitter and a receiver that may be used to wirelessly communicate with a network. Alternatively, music player may only have a wireless transmitter or a wireless receiver.

Music player 50 may use a variety of communication techniques to request or receive music files. Although the scope of the present invention is not limited in this respect, types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, Bluetooth™, third generation (3G) systems like Wide-band CDMA (WCDMA), CDMA-2000, and the like.

If a user would like to hear some music that is not already stored within music player 50 (e.g., within memory 52), transceiver 51 may use a wireless communication protocol to request a music file stored on either a personal computer 60, the internet 71, or another server 80. However, it should be understood that the scope of the present invention is not limited to the source of the requested music file. In alternative embodiments, the music file may come from a stereo system or from another music player that is part of a peer-to-peer system.

As shown in FIG. 1, personal computer 60 may comprise a transceiver 67 that may be used to provide the requested music file to music player 50. Although the scope of the present invention is not limited in this respect, personal computer 60 may be a general processing computer used to execute user applications. Accordingly, personal computer 60 may have the requested music file on its storage device (e.g. a hard drive, compact disk, etc.). However, personal computer 60 may also be a terminal or portal device that is connected to a network or the internet 71. In such an embodiment, personal computer 60 may access and retrieve the music file requested by music player 50.

In yet another embodiment, a user may store selected music files on a database within the internet 71 or within a database on a server 80. This may be advantageous if music player 50 may have greater or faster accessibility to server 80 rather than personal computer 60. Storing music files on server 80 may also be desirable if the music files are to be shared with other users or is the user is requesting the music file from a service that sells the music, although the scope of the present invention is not limited in this respect.

A method in accordance with an embodiment of the present invention is now provided. A user of music player 50 may request a music file that is not currently stored within memory 52. In this particular example, the user may make the request from an automobile. This request may be made directly to personal computer 60 or server 80, or to a service provider through a base station 85. Personal computer 60 may then provide the requested music file through a wireless communication, such as WCDMA (indicated in FIG. 1 with an arrow 61). Music player 50 may receive the requested music file through the wireless communication and store the music file in memory 52. Although the scope of the present invention is not limited in this respect, memory 52 may comprise volatile memory, such as static random access memory (SRAM), dynamic RAM (DRAM), etc., or non-volatile memory such as flash, EEPROM, etc. Once stored in memory 52, the user may play the music file at his leisure.

Figure 2:
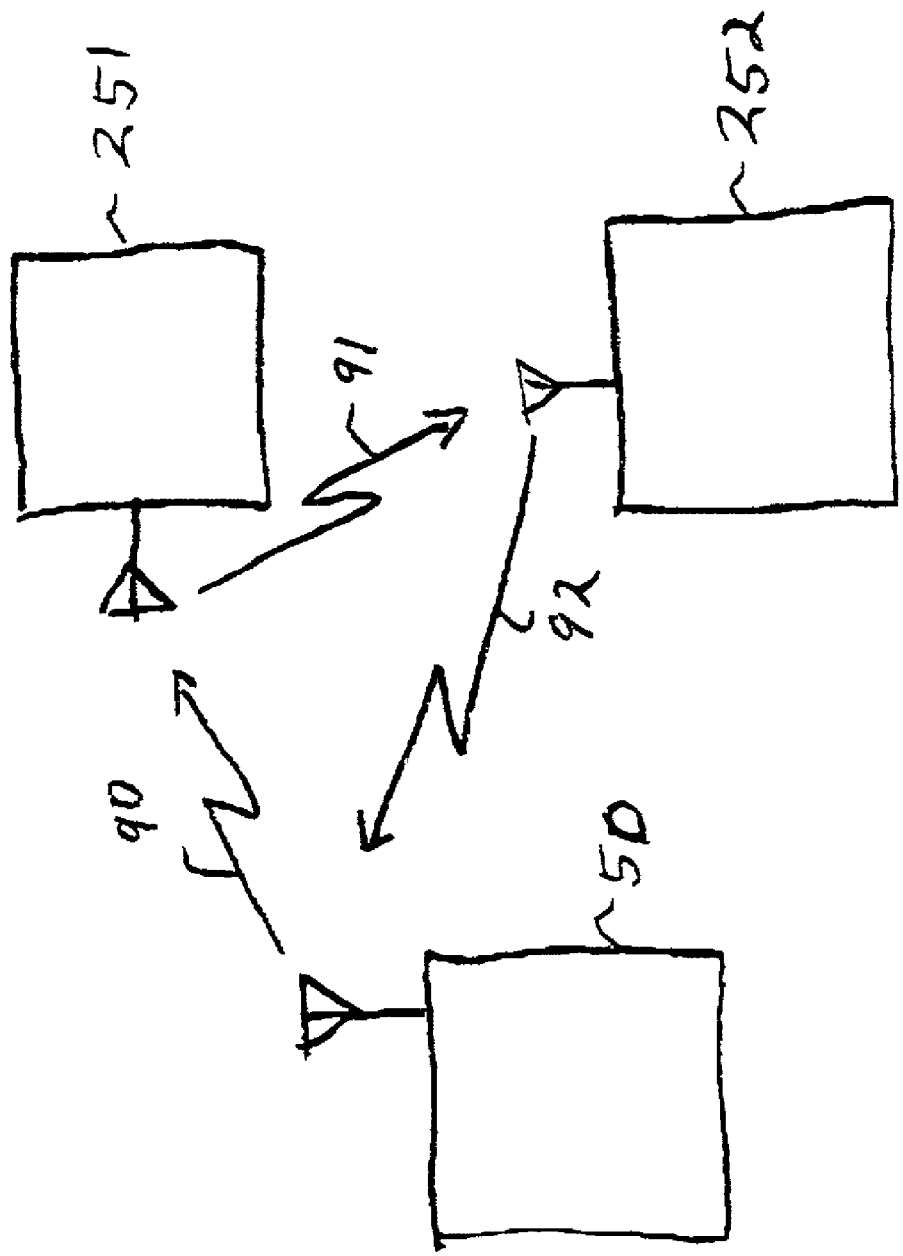
FIG. 2 is a block diagram representation of a peer-to-peer network in accordance with an alternative embodiment of the present invention.

Referring now to FIG. 2, an alternative embodiment of the present invention. Instead of requesting music files from a computer, a server, or the internet, music player 50 may receive a requested music file from other music players in a peer-to-peer network. For example, music players 50, and 251–252 may be in different automobiles that are in communication with other in a peer-to-peer network. Accordingly, music player 50 may transmit a request for a music file to music player 251 (indicated in FIG. 2 with an arrow 90). If music player 251 does not have the requested song or file, it may transmit a request to music player 252 (arrow 91). If music player 252 has the requested song, it may then transmitted the requested music file to music player 50 (arrow 92). It should be understood that the scope of the present invention is not limited by the number of music players that are in the peer-to-peer network, and not all of them need me mobile (e.g., within an automobile). In addition, the peer-to-peer network may also comprise all or some of the components shown in FIG. 1. For example, the peer-to-peer network may also include person computers, servers, base stations, or portals to the internet.

While certain features of the invention have been illustrated and described herein, many modifications, substitutions, changes, and equivalents will now occur to those skilled in the art. For example, a user may request and receive more than one music file (e.g., all the songs on an album). It is, therefore, to be understood that the appended claims are intended to cover all such modifications and changes as fall within the true spirit of the invention.

The invention claimed is:

1. A method of loading a music player with a music file, comprising:

establishing, with a transceiver associated with a first automobile on which the media player is disposed, a first wireless, peer-to-peer communication path with a first remote device to request a music file be provided to the music player, the request to provide being made without a priori knowledge of whether the music file resides on the first remote device; and receiving, with the transceiver associated with the first automobile, the requested music file from a second remote device, through a second peer-to-peer wireless communication path to the second remote device, the second remote device having the requested music file, and the second remote device being informed of the request by the first remote device, as a result of the first remote device not having the requested music file.

2. The method of claim 1, further comprising storing the received music file into a non-volatile memory disposed at the first automobile.

3. The method of claim 2, wherein the storing of the received music file includes storing the requested music file in a flash memory array disposed at the first automobile.

4. The method of claim 1, wherein the first remote device is disposed at a second automobile.

5. The method of claim 4, wherein the second remote device is disposed at a third automobile.

6. The method of claim 1, wherein said receiving comprises receiving at least a portion of the requested music file through a Bluetooth™ communication.

7. The method of claim 1, wherein said receiving comprises receiving at least a portion of the requested music file through a cellular communication.

8. The method according to claim 1, wherein the wireless peer-to-peer communication paths are established on an ad-hoc basis between the transceiver and the remote devices.

9. An apparatus comprising:

a transceiver, or a transmitter and a receiver;

a controller coupled to the transceiver or the transmitter and receiver to control the transceiver or transmitter to establish a first peer-to-peer wireless communication path with a first remote device to transmit a request to the first remote device to provide for the apparatus a music file, the request to provide to be made to the first remote device without a priori knowledge of whether the music file is available from the first remote device, and to control the transceiver or receiver to establish a second peer-to-peer wireless communication path with a second remote device to receive from the second remote device the requested music file, the second remote device being informed of the request by the first remote device as a result of the first remote device not having the requested music file, whereas the second remote device has the requested music file; and a storage medium, coupled with the receiver or transceiver, to store the requested music file received via the second peer-to-peer wireless communication path;

wherein the transceiver or the transmitter and receiver, the controller, and the storage medium are adapted for disposition in a first automobile.

10. The apparatus of claim 9, wherein one or more of the transmitter, receiver or transceiver are adapted to operate in Bluetooth™ communication.

11. The apparatus of claim 9, wherein the storage medium comprises flash memory.

12. The apparatus of claim 9, wherein the apparatus further comprises a media player adapted to plays the requested music file.

13. The apparatus of claim 9, wherein the first and second remote devices are disposed at a second and a third automobile, respectively.

14. A method comprising:

receiving at a device a request, from an automobile remotely disposed from the device via a transmitter associated with the automobile, to provide a media player disposed in the automobile a music file the request being received through a first wireless peer-to-peer communication path, and transmitted from the automobile without a priori knowledge of whether the music file is available from the device; and forwarding the request to another device, also remotely disposed from the device, as a result of the device not having the requested music file, to attempt to have the other device to provide the requested music file to the media player through a second wireless peer-to-peer communication path, if the other device has the requested music file.

15. The method of claim 14, further comprising transmitting the music file from the device to the media player of the automobile if the device has the requested music file.

16. The method of claim 14, wherein the device is disposed in a second automobile.

17. The method of claim 16, wherein the other device is disposed in a third automobile.

18. The method of claim 14, wherein either the first or the second wireless peer-to-peer communication comprises Bluetooth™ communication.

19. A system comprising:

one or more omnidirectional antenna(s);

a transceiver, or a transmitter and a receiver coupled to the antenna(s);

a controller coupled to the transceiver or the transmitter and receiver, to control the transceiver or receiver to establish a first peer-to-peer wireless communication path with a remote transceiver disposed at a first automobile to receive a request to provide a music file to a media player disposed at the first automobile, the request being made from the remote transceiver without a priori knowledge of whether the music file is available from the system, and to control the transceiver or transmitter to forward the request to another system to attempt to have the other system to provide the requested music file to the media player of the first automobile through a second wireless peer-to-peer communication path between the remote transceiver and the other system;

wherein the antenna(s), the transceiver or the transmitter and receiver, and the controller are adapted for disposition in a second automobile.

20. The system of claim 19, wherein one or more of the transceiver, transmitter or receiver are adapted to operate in Bluetooth™ communication.

21. The system of claim 19, wherein the other system is disposed in a third automobile.

* * * * *

UNITED STATES PATENT AND TRADEMARK OFFICE
CERTIFICATE OF CORRECTION

PATENT NO. : 7,143,939 B2
APPLICATION NO. : 09/741208
DATED : December 5, 2006
INVENTOR(S) : David P. Henzerling Page 1 of 1

It is certified that error appears in the above-identified patent and that said Letters Patent is hereby corrected as shown below:

Figure 1
Reference number "86" should be deleted.

Column 4
Line 33, "...a music file..." should read --...the music file...--.

Column 5
Line 27, "...to plays..." should read --...to play...--.
Lines 36-37, "...music file the request..." should read --...music file, the request...--.

Signed and Sealed this

Fourteenth Day of April, 2009

JOHN DOLL
*Acting Director of the United States Patent and Trademark Office*